(12) United States Patent
Besse et al.

(10) Patent No.: US 8,906,439 B2
(45) Date of Patent: Dec. 9, 2014

(54) PROCESS FOR SPRAYING A LAYER CONTAINING FAT AND SUGAR ON A SURFACE OF AN EDIBLE PRODUCT

(75) Inventors: Nicolas Besse, Gland (FR); Luc Gauduchon, La Rochelle (FR); Luis Machado, Champcueil (FR); Kari Tronsmo, Bingen (DE)

(73) Assignee: Generale Biscuit, Rungis (FR)

( * ) Notice: Subject to any disclaimer, the term of this patent is extended or adjusted under 35 U.S.C. 154(b) by 402 days.

(21) Appl. No.: 12/595,908

(22) PCT Filed: Apr. 18, 2008

(86) PCT No.: PCT/IB2008/001226
§ 371 (c)(1),
(2), (4) Date: Jan. 26, 2010

(87) PCT Pub. No.: WO2008/129417
PCT Pub. Date: Oct. 30, 2008

(65) Prior Publication Data
US 2010/0151095 A1     Jun. 17, 2010

(30) Foreign Application Priority Data
Apr. 24, 2007   (EP) .................................. 07290506

(51) Int. Cl.
| A23G 3/00 | (2006.01) |
| A23G 3/22 | (2006.01) |
| A23L 1/00 | (2006.01) |
| A23G 3/34 | (2006.01) |
| A21C 15/00 | (2006.01) |
| A23G 3/20 | (2006.01) |
| A23G 1/20 | (2006.01) |
| A23G 1/00 | (2006.01) |

(52) U.S. Cl.
CPC ............ *A23G 3/0089* (2013.01); *A21C 15/002* (2013.01); *A23G 3/2092* (2013.01); *A23G 1/201* (2013.01); *A23L 1/0061* (2013.01); *A23G 1/005* (2013.01)
USPC .......................................... 426/306; 302/304

(58) Field of Classification Search
CPC ... A21C 15/002; A23G 1/005; A23G 3/0089; A23G 3/2092; A23G 1/201; A23L 1/0061
USPC .................................................. 426/303, 306
See application file for complete search history.

(56) References Cited

U.S. PATENT DOCUMENTS 2,915,024 A * 12/1959 Kruger et al. .................. 426/306
3,470,831 A * 10/1969 Drachenfels .................. 426/306

(Continued)

FOREIGN PATENT DOCUMENTS

| EP | 0 554 707 | 8/1993 |
| GB | 28371 A | 0/1913 |

(Continued)

OTHER PUBLICATIONS

International Search Report and Written Opinion from International Patent Application No. PCT/IB2008/001226, filed Apr. 18, 2008.

*Primary Examiner* — Humera Sheikh
*Assistant Examiner* — Subbalakshmi Prakash
(74) *Attorney, Agent, or Firm* — Alston & Bird LLP

(57) ABSTRACT

The invention relates to a process for applying a layer of a composition comprising at least fat and sugar on a surface of an edible product, characterized in that it comprises submitting the product to at least two spraying stages, each involving generating by at least one nozzle a conical jet having an angle α and a vertical axis, said nozzle being disposed above the product at a height H between 200 mm and 800 mm and preferably between 300 mm and 650 mm so that, upon impinging on the product, the jet has become a vertically oriented drizzle with a substantially cylindrical cross-section.

29 Claims, 5 Drawing Sheets

(56) References Cited

U.S. PATENT DOCUMENTS 4,283,012 A     8/1981   Hanson
4,986,475 A * 1/1991   Spadafora et al. ......... 239/218.5
5,370,734 A * 12/1994 Ferrero ........................... 118/13

FOREIGN PATENT DOCUMENTS

GB           2 012 543 A      8/1979
WO      WO 03/079803 A     10/2003
WO      WO 03079803 A2 * 10/2003

* cited by examiner

PROCESS FOR SPRAYING A LAYER CONTAINING FAT AND SUGAR ON A SURFACE OF AN EDIBLE PRODUCT

CROSS REFERENCE TO RELATED APPLICATIONS

This application is a national stage application filed under 35 U.S.C. 371 of International Application No. PCT/IB2008/001226, filed Apr. 18, 2008, which claims priority from European Application No. 07290506.0, filed Apr. 24, 2007.

FIELD AND BACKGROUND OF THE INVENTION

This invention relates to a process for applying on a surface, and more particularly on a curved or irregular surface of an edible product such as a biscuit, a wafer or a snack a layer containing at least fat and sugar and more particularly a layer of chocolate or of chocolate substitute.

In a general trend of growing demand for thinness, lightness and sophistication, coated products associating a layer such as a layer of chocolate with an edible product, generally a cereal-based shell such as a wafer, an extruded snack or a biscuit are often perceived as thick and heavy, or as too basic.

This perception comes from the fact that conventional industrial processes to apply such a layer on a cereal-based shell, such as covering, bottoming, dipping or moulding either require a large and heavy product, typically above 8 cm$^3$ and above 5 g, or result in irregular amounts of e.g. chocolate and basic appearance, typically small products with surface irregularities and a weight of chocolate varying by +/−8% or more among products. The resulting products are either high in energy per portion, typically above 22 Kcal per piece, or have a small size but can be packed only in bulk due to their irregular dimensions.

Known industrial processes apply chocolate on a cereal-based shell in liquid form, with an integral contact to the surface of the shell. The viscosity and the yield value of tempered chocolate, combined with the non-limiting amount of chocolate present in such a liquid mass, result in a layer of chocolate of minimum 0.075 g/cm$^2$ (over 0.60 mm thick), and more often of more than 0.125 g/cm$^2$ (over 1.0 mm thick). Indeed, when the liquid mass of chocolate is in contact with the surface of the shell, it thickens until the gravity becomes stronger than the adherence.

Attempts to reduce the thickness of chocolate layer by means of reducing the upstream flow of chocolate result in faulty chocolate covers: presence of empty spots, or significant differences in thickness from one area of the shell to the other, especially when the shell doesn't have a flat surface.

Attempts to reduce the thickness of chocolate layer by means of modifying the viscosity of chocolate and its yield value whilst keeping a temperature compatible with tempered chocolate and maintaining the level of emulsifiers like PRPG (polyricinoleate polyglycerol) at an authorised level result in chocolate recipes with lower amount of cocoa mass which does not fit to consumer expectations of tasty and natural recipe.

The alternative known technique of blowing air onto the chocolate surface results in a waved aspect, which results in a product that it not smooth.

Another technique which involves spraying chocolate with nozzles, has several major drawbacks, such as air turbulence lifting products, impact dots resulting in uneven surface, temperature and pressure stress endangering tempering.

Chocolate spraying is used only for relatively large products—typically more than 30 cm$^2$—with a flat top surface and preferably a rectangular shape resulting in a wide cover—typically more than 80%—of the surface exposed to spraying. A typical example thereof is a large soft cake with a chocolate cover.

There is no known process of chocolate spraying which allows to apply a very thin layer of a product comprising at least fat and sugar e.g. chocolate or chocolate substitute on a smooth surface with satisfactory results relatively to product aspect and/or surface shininess and/or industrial efficiency.

SUMMARY OF THE INVENTION

The object of the present invention is to apply a thin layer on a non-flat cereal shell, with a satisfactory aspect while preferably avoiding significant loss of product and shells.

Another object of the invention is that said thin chocolate layer remains shiny.

At least one of these objects is met by a process as in claim 1. Ways of performing this process are expressed in the dependent claims.

BRIEF DESCRIPTION OF THE DRAWINGS

The invention will be better understood in relation with the following description together with the appended drawings where.

MORE DETAILED DESCRIPTION

Figure 1A:
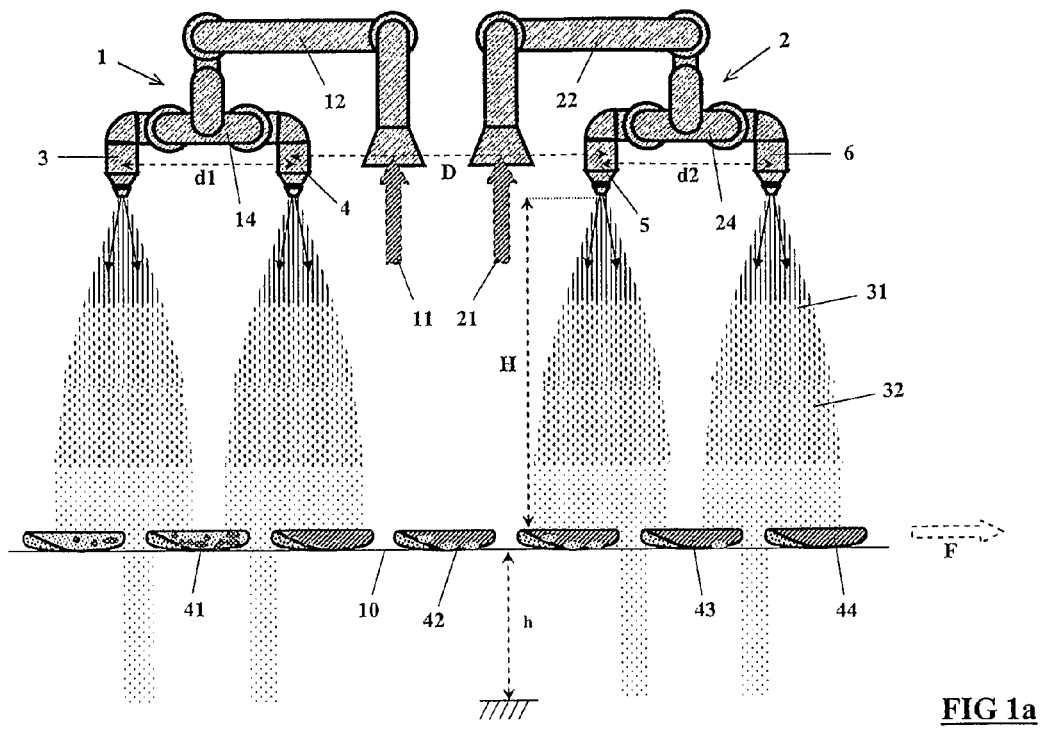
FIGS. 1a to 1c represent an example of a station for spraying chocolate according to the invention, respectively in side view (1a), front view (1b) and top view (1c)

The invention is described in relation with curved leaf-shaped shells generally made mainly of flour, starch, sugar, whey powder and butter which are sprayed with chocolate on their convex face by at least two spraying stages and preferably four spraying stages, to obtain a layer of chocolate that is thin, homogeneous, smooth and preferably shiny.

The spraying process may be performed on surfaces of any shape, but it is more specifically directed to irregular or curved surfaces. It may be used for spraying chocolate as defined in the European Directive 2000/36/EP of Jun. 23, 2000 (related to cocoa and chocolate products intended for human consumption), or for spraying a chocolate substitute namely a product corresponding to said definition of chocolate but for which the fat portion is partly or totally constituted by fats that do not correspond to the definition of vegetable fats given in Annex II of said Directive, or exceed the authorised percentage of these fats.

The process may also be performed with sprayable compositions comprising fat and sugar, as long as its viscosity is compatible with spraying through a nozzle.

Absence of dots which results in homogeneity and smoothness is mostly obtained by the distance between spraying nozzles and products, and to a lesser extent by the air pressure used to nebulize the sprayable composition, e.g. of chocolate.

Parameters for the optimization of the smoothness, cover and regularity of chocolate layer are the temperature of the cereal shell, the geometric and dynamic characteristics of the nebulized jet.

Low level of shell waste caused by air turbulence may be assured by spacing the nozzles from the inner walls, by the distance between nozzles and products, and by the pressure of the nebulized air. Since there is a free space around the products, turbulences are avoided.

A good chocolate tempering index, which as is known, is important to avoid a bland appearance (this does not apply to chocolate substitutes which generally do not require tempering), is obtained by a temperature-controlled system, a short passage time between a tempering unit and an injection rail, and a tempering capacity largely superior to the chocolate consumption.

Chocolate waste caused by solidification inside the system is made very low by way of a heated double jacketed spraying box, onto the inner wall of which chocolate droplets remain melted and drop by gravity down to the inferior tank where they form a liquid that is pumped, de-tempered, filtered and re-injected into the cycle at the level of the tempering unit.

Optionally, a very thin film of coating agent is applied onto the surface of chocolate to protect it against scratches and melting, and to make it shinier. This coating is applied by means of a similar spraying system as for chocolate, where a coating is diluted in alcohol, sprayed onto chocolate during its crystallisation, and where alcohol is extracted during the remaining crystallisation time.

Optionally, a topping such as nut pieces, praline pieces or candied fruit zest pieces is dropped onto the products, preferably between the second and third chocolate spraying stages, so as to form a visible decor—colour and relief of pieces is very visible as only a thin layer (e.g. 0.2 mm) of chocolate is covering the pieces, firmly fixed inside the chocolate despite a size of particles (1 to 3 mm) that is larger (by e.g. over five times) than the thickness of chocolate layer.

In the example described below, thin (1.0 to 1.4 mm thick) curved leaf-shaped shells made mainly of flour, starch, sugar, whey powder and butter, with a density between 0.58 and 0.65 g/cm$^3$, a developed surface of 20 to 30 cm$^2$, a weight of 1.9 to 2.2 g and a constant curvature radius of 25 to 32 mm, are sprayed with chocolate on their convex face by two series 1 and 2 of two spraying stages (3, 4; 5, 6) with a resulting total spraying cycle of 6 to 42 seconds—preferably 25 to 30 seconds.

Distance D between the two series 1, 2 of nozzles is chosen so that the transit turn is between 4 to 40 seconds, preferably over 20 seconds.

The shells 40 are disposed on a wire-mesh conveyor 10 that moves in the direction of arrow F at a constant speed.

Series 3 and 4 of nozzles are spaced by a distance $d_1$ so that the transit time between them is between 1 to 5 seconds, preferably 3 seconds. Distance $d_2$ between series 4 and 5 of nozzles is also chosen so that the transit time is between 1 to 5 seconds, preferably 3 seconds.

Spraying and nebulizing the chocolate allows to put a very small amount of chocolate (in droplets form) in contact at once with the shell.

The height H between the nozzle and the products is between 200 mm and 800 mm and preferably between 300 mm and 650 mm. A height H of 200 mm is sufficient for the conical jet 31 to become rather cylindrical which provides good spraying conditions on the products, because the droplets essentially propagate vertically, and because their speed is lower and less dispersed than near the nozzles.

The best results are obtained with nozzles for liquid with a duct diameter of 1.5 to 2.0 mm and with air pressurised in conical jet with an angle α between 12° and 25° and preferably 18°. Pulverisation air pressure is between 1.5 and 4 bars, pulverisation air throughput is between 2 and 10 liters/min for each nozzle, and air ejection speed right out of the nozzle is between 10 and 50 m/s. The best results are obtained with air pressure between 1.8 and 3.8 bars, for a chocolate throughput between 1.4 and 2.5 g/s at each nozzle, preferably between 1.6 and 2.2 g/s. Below 1.8 bars the drizzle 32 is rough and the droplets are large; above 3.8 bars air turbulence in the neighbourhood of the shells become too strong and tend to blows the products if they are light such as thin biscuits.

The resulting layer of chocolate is homogeneous (thickness may vary by less than 0.15 mm on the whole surface), smooth and has a surface density of 0.045 to 0.065 g/cm$^2$, preferably 0.053 g/cm$^2$. This chocolate layer has a theoretical thickness of 0.36 to 0.52 mm, preferably 0.43 mm, based on a chocolate density of 1.25 g/cm$^3$. It represents 33 to 46% of total product weight. The resulting product 44 (see example in FIG. 4) has a total energy of 15 to 18 Kcal for a weight of 3.2 to 3.7 g. As part of the chocolate penetrates into the very small cavities of the shell, the additional thickness of the product after chocolate application is 0.10 to 0.20 mm less than the sum of shell thickness ($h_0$=1.0-1.4 mm) and theoretical thickness of chocolate layer. As a result, the cover of chocolate makes the product 0.20 to 0.30 mm thicker ($h_1$) than the plain shell, and the finished product 44 has a thickness (h) of 1.2 to 1.7 mm.

The control of chocolate throughput may be assured by a second compressed air circuit, with a setting independent from pulverisation air. This compressed air pushes directly onto chocolate upper surface in the buffer tank. The throughput of 1.4 to 2.5 g/s is obtained with a tank air pressure between 1.1 and 3.5 bars, typically between 1.3 and 2.6 bars in the case of an installation designed for 6 biscuits per row. An alternative technical solution to control chocolate throughput consists in using a volumetric pump or a weight-flow dosing system installed right after buffer tank.

Figure 3:
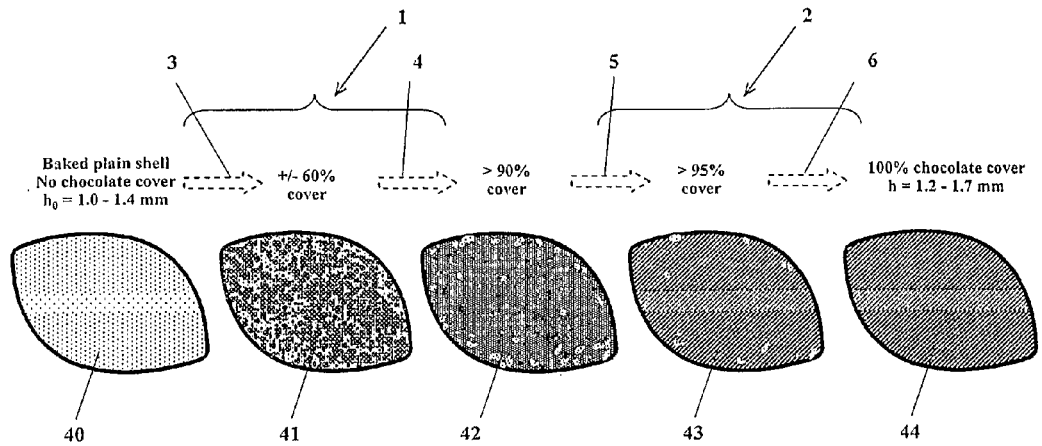
FIG. 3 illustrates the change in product aspect throughout the spraying process.

As shown in FIG. 3, the first spraying stage 3 gives a cover of the shell 41 of over 60%, made of round spots of 0.5 to 2 mm diameter, each of them corresponding to the impact of a droplet of 0.04 to 0.6 mg (0.4 to 1 mm diameter). A rough observation shows that the number of visible spots ranges between 50 and 150 spots per cm$^2$ of shell.

The second stage 4 gives a cover of 90% to 100% of the surface of the shell 42, with a chocolate average surface density of 0.02 to 0.03 g/cm$^2$, with a more homogeneous surface than after first stage, but still some visible contrasts in chocolate layer thickness, typically between 0.15 and 0.30 mm. Nevertheless, this cover allows to drop nut or fruit pieces with a very satisfactory adherence onto the chocolate, as more than 90% of the surface is already covered.

Attempts to replace the first two stages 3 and 4 by one single stage and a same surface density results in a lower cover of the shell by chocolate, typically over 70 to 80%, with a chocolate layer thicker than 0.35 mm in some areas. Such irregularities would make it impossible to drop nut or fruit pieces with an acceptable repartition onto the surface, as empty areas cannot retain any piece. Furthermore, it will result in a final chocolate layer varying by more than 0.15 mm thickness on the whole surface of the shell.

The third 5 and the fourth 6 spraying stages result in a 100% cover of the shell (43 after the third stage and 44 after the fourth stage), with a chocolate layer increasing product thickness by 0.25 mm in average; this additional thickness is comprised between 0.20 and 0.35 mm on any point of the cover. The regularity of chocolate layer thickness is much better with four stages that it would be with three stages and of course with only two stages.

A deeper analysis of the system indicates that to get a regular cover, it is preferable to have droplets having a small size, namely with a diameter less than 1 mm (0.6 mg), with an average diameter close to 0.6 mm (0.15 mg).

This size means that the number of droplets deposited on one product of 20 to 30 $cm^2$ ranges between 3,000 and 30,000 droplets. This small size and large amount are best obtained when combining an air pressure above 1.8 bars, a chocolate initial dilution between 1 and 5% in air, and a throughput of chocolate close to 2 g/s at each nozzle.

The main reason why four stages are preferable for an industrial installation relates also to the exposure time. Indeed a conic jet with a 18° angle cannot cover homogeneously an area of more than 60 mm diameter with the pressure range that is used. Due to gravity and air resistance effect on the droplets, the initial cone becomes a drizzle after a dropping height of 200 mm with a diameter of 60 to 100 mm. As over 60% of the chocolate is generally recycled (due to the geometry of the products, to the contact with the walls, and to the formation of a mist), one nozzle (over 2 g/s) can cover one product (1.4 g) in minimum 1.4/(2×40%)=1.7 s, which means that the product should remain 1.7 s in an area of 60 mm long, i.e. move at 2 m/min. This speed is not compatible with industrial production, for which usual speeds are closer to 8-12 m/min, hence the necessity to spread the spraying into preferably four stages so as to expose each shell to the chocolate drizzle during 1.7 s minimum (actually four times 0.4 s).

The spacing $d_1$ and $d_2$ of minimum 150 mm (1 s) between two consecutive stages (3-4 and 5-6) avoids air flow perturbations between two cones and let each jet as homogeneous as possible. The spacing D of minimum 600 mm (4 s) between stages 1 and 2 lets an empty space of minimum 300 mm to optionally drop nuts or fruits onto the products. Also, using several stages helps in obtaining a more homogeneous thickness of the chocolate layer.

The lateral spacing of the nozzles ($3_1, 3_2 \ldots 3_{N+1}; 4_1 \ldots 4_{N+1}; 5_1, \ldots 5_{N+1}, 6_1 \ldots 6_{N+1}$) of a spraying stage (N being the number of lanes of products on the conveyor) is chosen so that it allows the chocolate drizzles 32, 33, 34, 35, 36, 37 and 38 to join or to intersect. For example with a diameter D of 60 mm, the spacing may be between 50 mm and 60 mm which in this example is consistent with the spacing of two lanes of products on the wire mesh 10.

Absence of dots is assured by the combination of a reasonable air pressure used to nebulize chocolate, and a minimum height H between the spraying nozzles and the products on wire mesh 10. The best results are obtained with an air pressure below 4 bars, preferably close to 3.5 bars, and a height H between 300 and 650 mm, preferably 600 mm. In those conditions, the chocolate drizzle is fine enough, and has the right vertical speed to deposit well while not dotting the surface (FIG. 3). A height H as low as 200 mm may be used since this distance is enough to have the initial conical chocolate jet become a drizzle providing an homogeneous covering; however such a low height increases the risk of blowing the products if they are light such as thin biscuits.

Figure 1B:
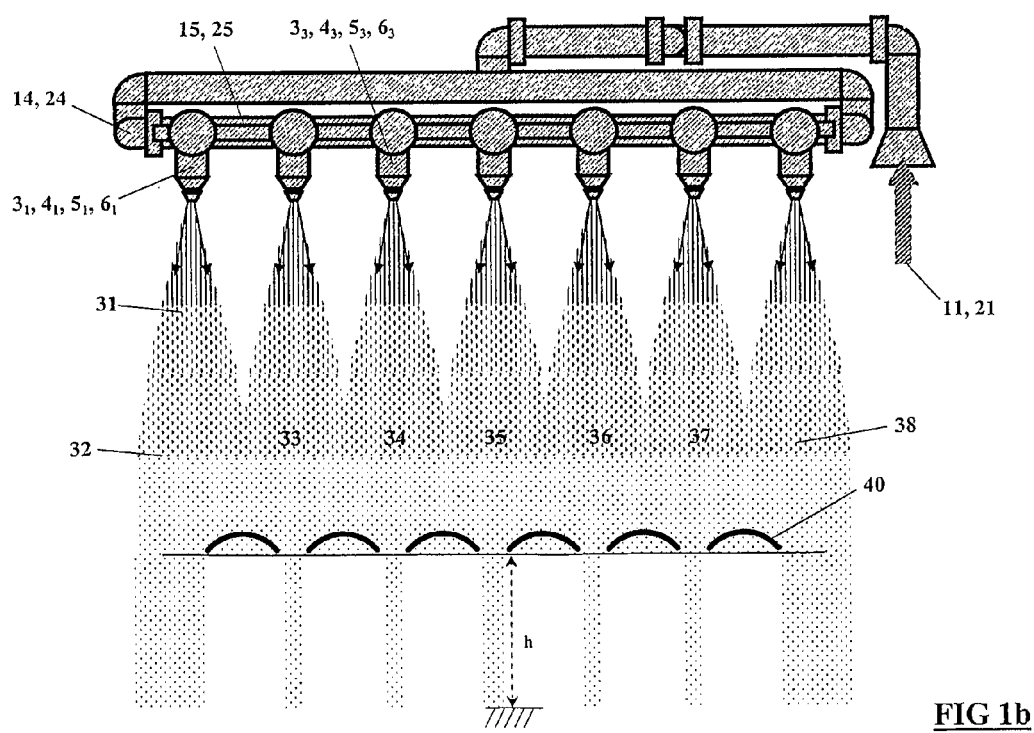
Figure 1C:
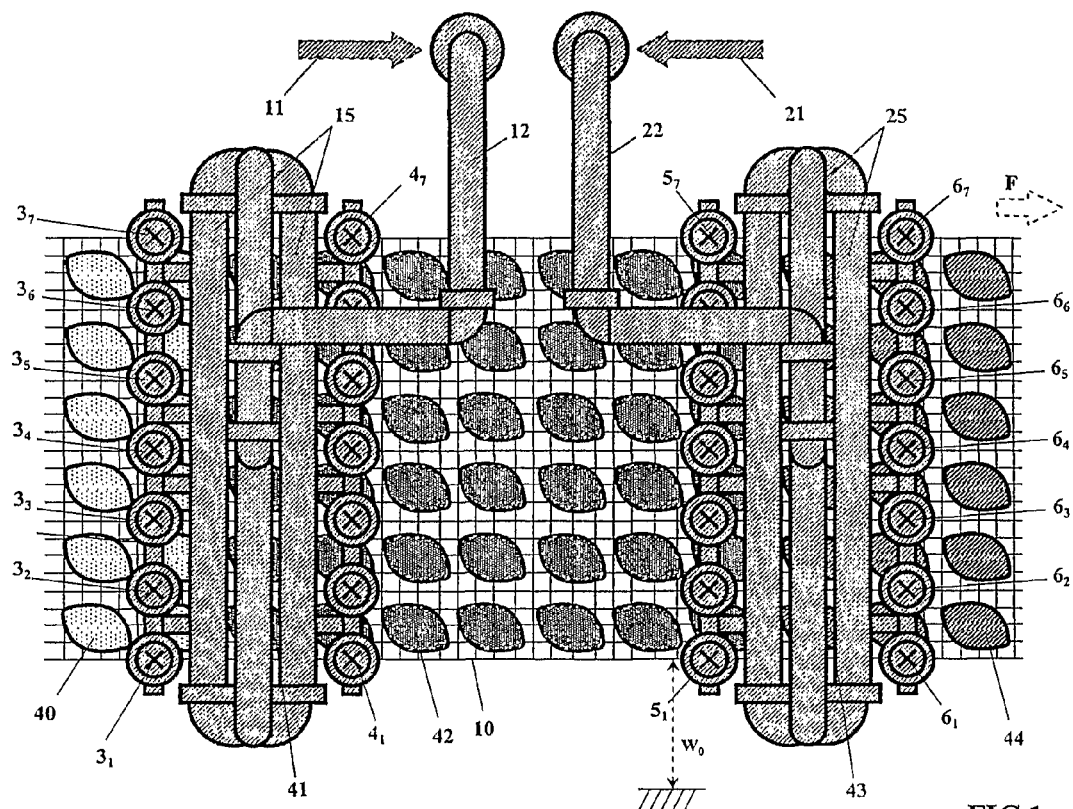
Figure 2:
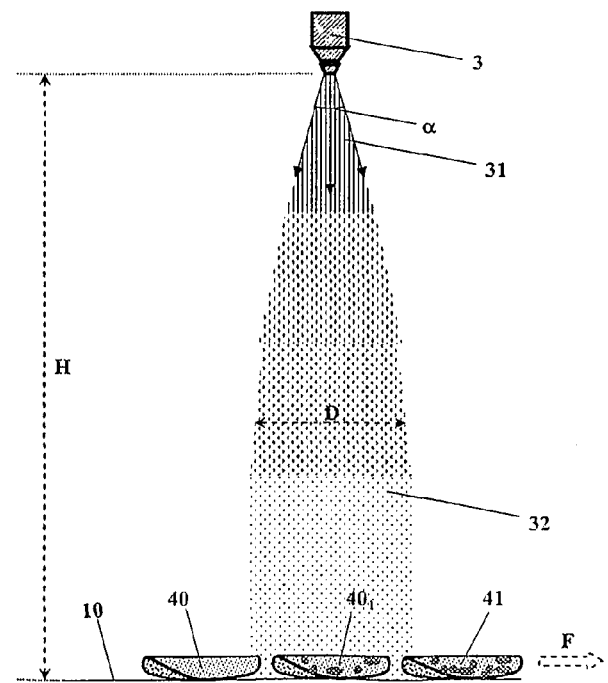
FIG. 2 illustrates the spraying of chocolate by a nozzle according to the invention.
Figure 5:
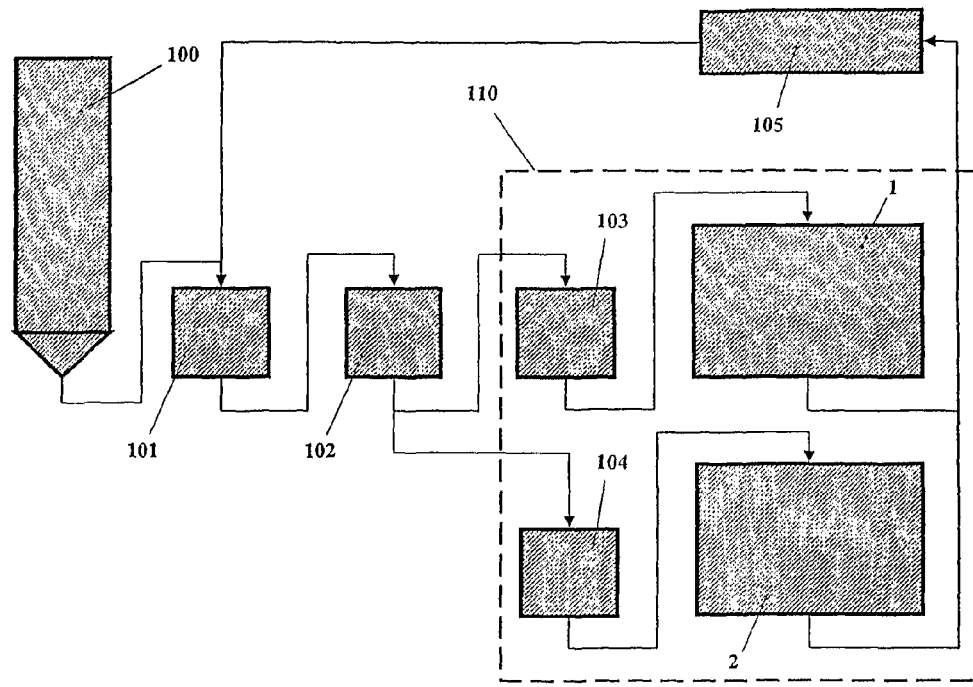
FIG. 5 shows a chocolate facility flow diagram.

The device for feeding chocolate to the nozzles comprises (FIG. 5) a chocolate storage tank 100, a chocolate buffer tank 101, a chocolate tempering unit 102 and a spraying station comprising two spraying tanks 103 and 104 each feeding one of the spraying units 1 and 2 each comprised of one or preferably two spraying stages (FIGS. 1a-1c).

Figure 4:
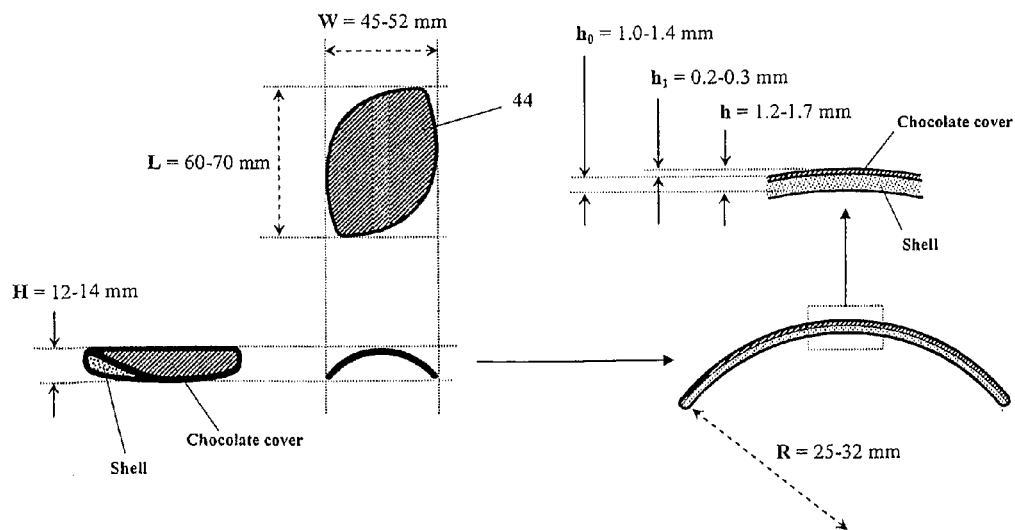
FIG. 4 is an example of a finished product according to the invention.

Maintaining a chocolate tempering index from the tempering unit up to the spraying nozzles is important to avoid a bland appearance of products. It is obtained by a temperature-controlled system, with a double jacketed frame at 30° C.+/−1° C., a double jacketed buffer tank at 32° C.+/1° C., double jacketed pumping pipes at 32° C.+/−1° C., and a heating of compressed air at 30° C. Furthermore, a short time of passage of the chocolate between tempering unit and spraying nozzle, typically less than 20 min, improves the stability of the system in term of tempering index and products shininess. Such a short time of passage implies that the mass of chocolate that is present in the buffer tank, the pipes and the injection common rail is lower by a factor 3 or more than the hourly throughput. At last, a tempering capacity superior to the chocolate consumption by a factor between 2.5 and 4, preferably 3.5 to 4, also contributes to maintain a good tempering index up to the spraying nozzles. The three above-mentioned conditions (temperature, passage time and tempering capacity) allow that the chocolate that is tempered in the buffer tank is also well tempered when it is ejected from the nozzles (FIG. 4).

The smoothness and regularity of the chocolate layer is improved when the temperature of the cereal shell is 27° C.+/−1° C.; therefore it is necessary to have a controlled cooling of shells between the oven outlet and the spraying station. Another significant lever to improve the smoothness of the chocolate surface is the absence of air turbulence and droplets bounce at the neighbourhood of the edges of the biscuits. This is better obtained when the products are conveyed on a wire mesh rather than a conveyor, with an empty space h of minimum 200 mm and preferably more than 300 mm below the product flow and an empty space $W_0$ of minimum 100 mm and preferably more than 200 mm on both sides of the segment formed by the nozzles of each of the four rails of nozzles (see FIGS. 1a, 1b and 1c).

At last, a better covering of the curved surface of the products is obtained by positioning the spraying nozzles not at the vertical of each biscuit lane, but between two lanes of biscuits as shown is FIGS. 1a and 1c, so that each of the N biscuit lanes receives chocolate from two of the N+1 spraying nozzle at each stage. When the nozzle is just above a lane of biscuits, the cover is not satisfactory on the edges of the curved biscuits, which can be inclined by up to 40° vs the horizontal plane, and thus present a surface that is too "tangent" if the chocolate droplets arrive in majority from the central part of the biscuit. The combination of empty space around the flow of biscuits and staggered positioning of the nozzles vs the biscuit lanes, as described above, also contributes to decrease to an acceptable level, typically less than 2%, the ratio of biscuits that are blown, twisted or turned upside down during their passage across the spraying station.

For example, with N lanes of biscuits and 4 rails of N+1 nozzles, the throughput of the installation is over 150*N biscuits per minute with 1.4 g of chocolate per biscuit. FIG. 1a-1c shows an installation with N=6. In case N is superior to 10, the biscuits lanes located on the right and left side of the line tend to be less covered by the chocolate than the ones located in the centre, as the drizzle is subjected to side effects. To solve this issue, the number of nozzles can be advantageously increased from N+1 to N+3 or even N+5, keeping the same spacing in-between each nozzle as in-between each biscuit lane, to assure a regular distribution of chocolate within the N lanes of biscuits.

The type of chocolate is also an important factor. All chocolates can be sprayed, but all don't give a smooth and shiny layer. Total fat content of chocolate (coming from cocoa liquor, cocoa butter, whole milk powder and butter fat) is advantageously between 33 and 42%, preferably between 35 and 39%. Lower amounts of fat lead to a less shiny cover and a less consistent process. Higher amounts of fat lead to a translucent and less tasty chocolate cover: indeed, as the layer is very thin, a high quantity of fat has a "diluting" effect on the overall colour and taste of chocolate. Viscosity (measured at 40° C. which is not the temperature at which the chocolate leaves the nozzles) is advantageously between 700 and 1,300 mPa·s, preferably between 900 an 1,100 mPa·s. These values of viscosity are also valid for compositions with fat and sugar (without cocoa) and for a chocolate substitutes.

Too high a viscosity leads to a decrease of chocolate throughput, which cannot be entirely compensated by a higher air pressure in the tank. Too low a viscosity increases the variability of throughput among nozzles across the line.

Yield value is preferably between 0.5 and 1.5 Pa at 40° C. If it is below 0.5 Pa at 40° C., the chocolate tends to leak on the curved surface of the biscuit and forms a sole; furthermore some translucent areas might appear on the biscuit.

If yield value is above 1.5 Pa at 40° C., an "orange peel" appearance is obtained, or even a "lunar" surface with craters, so that the smoothness of the surface is affected.

As long the above-mentioned profile of chocolate and temperature of the system is met, it is possible to obtain a variability of the chocolate throughput among the nozzles that is not higher than e.g. +/−4%, and a variability of the chocolate weight among the biscuits that is not higher than e.g. +/−7%.

Here are two formulas of chocolate, one dark and one milk that give very good results both in term of process and taste:

|  | Dark chocolate | | Milk chocolate | |
| --- | --- | --- | --- | --- |
|  | Workable range | Ideal range | Workable range | Ideal range |
| Cocoa liquor | 52-59% | 55-58% | 26-31% | 28-30% |
| Sugar | 34-39% | 35-37% | 31-37% | 32-35% |
| Whole milk powder | — | — | 10-15% | 12-14% |
| Skimmed milk powder | — | — | 2-6% | 4-5% |
| Whey powder | — | — | 0-3% | 1-2% |
| Cocoa butter | 3-8% | 4-6% | 14-20% | 16-18% |
| Butter fat | 1-3% | 1.5-2.5% | — | — |
| Emulsifiers | Optionally: soy lecithin, polyricinoleate polyglycerol | | | |

Taking the dark or milk chocolate recipes defined above as "workable range", and replacing cocoa liquor, cocoa butter and butter fat by a mix of cocoa powder (13-29%), vegetable fat (27-38%) and optionally sugar (with a similar amount of total fat in the resulting recipe), we obtain recipes of chocolate substitute that are also suitable for this spraying application. Furthermore, other ingredients like colouring or flavouring agents can be added for such applications.

Taking the milk chocolate recipe defined above as "workable range", and replacing cocoa liquor by a mix of cocoa butter (6-18%), milk powder (4-15%) and optionally sugar, we obtain recipes of white chocolate that are also suitable for this spraying application.

Taking this white chocolate recipe, and replacing cocoa butter by vegetable fat, and possibly milk powder by whey powder or lactose, we obtain recipes of white compound that are also suitable for this spraying application. Furthermore, other ingredients like colouring or flavouring agents can be added for such applications.

After the ejection of a chocolate jet from the nozzles, chocolate waste caused by solidification inside the system is made very low by a double-jacketed frame at 30° C.+/−1° C., which has an inner wall on which chocolate droplets remain melted and leak by gravity down to the inferior tank where they form a liquid that is pumped, de-tempered, filtered and re-injected into the cycle at the level of the tempering unit.

The smallest droplets which don't reach the inner wall of the frame may be exhausted as a mist by means of a ventilator located on the side of the system. The droplets are pulled by the small resulting depression and accumulated on a heated wall on which they melt, which allows to recycle or scrap easily this small amount of chocolate.

The profile of crystallisation of the chocolate layer is a parameter to obtain shiny products. The thin layer of chocolate is very sensitive to temperature profile; a too low temperature—typically 12° C. or less—deteriorates the crystallisation and gives "whitened" areas on the surface, which means a start of fat blooming. The best results are obtained with a passage time of 8 to 10 min with a profile of 18-15-18° C. and a top and bottom radiant cooling. As relative moisture should not exceed 45% to prevent water uptaking by biscuit shells, a very small convective cooling can be added to help air drying, and possibly foster alcohol vapour extraction in the case of application of a coating agent (as described below).

Optionally, an ultra-thin film of coating agent is applied on the surface of chocolate to protect it against scratches and melting, and to make it shinier. This coating is applied by means of a spraying system similar to the spraying system for the chocolate, but with a single spraying stage and a same staggered location of nozzles relatively to the product lanes. A coating mixture is diluted in alcohol, sprayed onto the chocolate layer during its crystallisation, and alcohol is extracted during the remaining crystallisation time.

A good compromise between a shiny aspect of the products and the absence of plastic or alcohol aftertaste is obtained with a coating mixture of purified shellac, vegetable oil and glycerine, diluted at a level of less than 15% in ethanol (i.e. 85% of ethanol in volume or more), with a final surface density of the coating agent between of 0.35 and 0.57 mg/cm$^2$, preferably 0.46 mg/cm$^2$, equivalent to 0.29 to 0.44% of total product weight, preferably 0.35%.

The lower the dilution ratio, the better the cover, but the drawback of a very low dilution is a very high throughput of alcohol which generates issues of safety and exhaust. The best results are obtained with a dilution between 7 and 10%.

To get the right quantity of coating with such an initial dilution and an exposure time of over 0.35 s (10 m/min and a spraying cone with a diameter of 60 mm), the throughput of alcohol is 20 to 30 times higher than the net consumption of coating, with an air pressure in the tank between 1.3 and 1.4 bars. In term of coating consumption, the yield of the installation depends much on the ratio of horizontal surface covered by products; but generally it is lower than 50%. The variability of the quantity of coating agent on the products is over +/−20% among products.

When the coating is over 0.35% in weight of the finished product, the product has no plastic aftertaste. The alcohol smell and aftertaste is minimised by means of a passage of minimum 5 min in the chocolate crystallisation tunnel, wherein a smooth dried air circulation allows to exhaust the majority of the remaining alcohol vapours, with a resulting alcohol content below 0.2% of the total product weight. Longer stays in a tunnel or in a static chamber improves further alcohol extraction, but exposes for too long the non-covered side of the cereal shell to air, with a resulting risk of moisture uptaking and texture degradation before the product is packed.

The absence of impact dots of alcohol on the chocolate layer is linked to pulverisation air pressure, distance in-between spraying nozzles and products, and crystallisation level of chocolate at the time of biscuits passage under coating nozzles. Best results are obtained with a pressure of 1.6 bars, a vertical distance H of 90 to 120 mm, at which the spraying jet is still conical and a time of 2 to 3 min, preferably 2.5 min, between chocolate spraying and the spraying of the coating, with a chocolate layer cooled down to 24 to 26° C. at the time of coating application. A shorter time between chocolate and coating results in a softer chocolate surface, much more sensitive to the impact of alcohol droplets. A longer time between both stages doesn't improve significantly the smoothness, but has the drawback of shortening the time available to exhaust alcohol vapours before the products are packed. Such settings also minimise the bounce of alcohol droplets on the conveyor.

When nozzles are closer to products (H lower than 90 mm), or when pulverisation pressure is higher, those bounces mark the products, creating a visible streak of 2 to 5 mm width on each lateral edge of the biscuit surface, in the area located at less than 4 mm of the conveyor. This can also be avoided when using a metal wire mesh instead of a plastic flat conveyor, but the in-line cleaning of a wire mesh clogged up by coating agent is difficult, whereas a flat plastic conveyor can be scraped quite easily in-line.

If the chocolate surface is not warm enough (less than 18° C.) at the time of coating application, the diluted coating retracts into small "tears" of 0.5 to 8 mm width; after vapour evaporation, the result is a product with a "leopard" aspect, alternating shiny dots and blander zones. Such a phenomenon also happens if the alcohol or pulverisation air is not heated, or if ambient air is not warm enough which cools alcohol droplets before they attain chocolate surface. This can be prevented by means of a chamber heated between 26° C. and 28° C., an alcohol tank heated at 29 to 31° C., and a pulverisation air heated at over 70° C.

Optionally, a topping such as nut pieces, praline pieces or candied fruit zest pieces is dropped onto the products preferably between the second 4 and third 5 chocolate spraying stages, so as to form a visible decor—colour and relief of pieces is very visible as only 0.2 mm chocolate is covering the pieces—, firmly fixed inside the chocolate despite a size of particles (typically 1 to 3 mm) larger by over five times than the thickness of chocolate layer.

Figure 7:
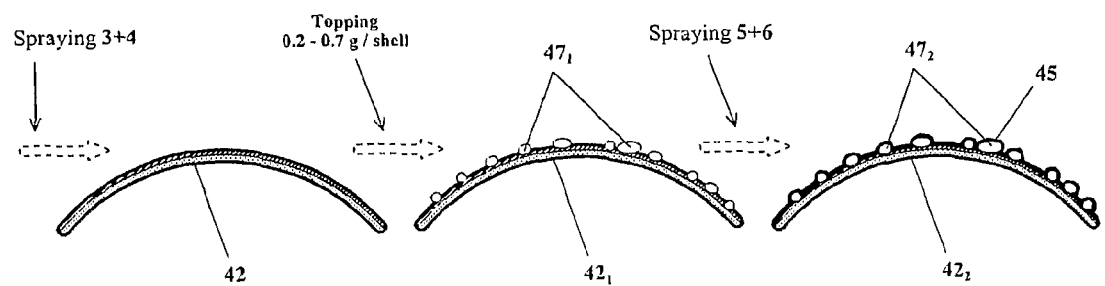
FIG. 7 illustrates the change in product aspect during the topping process.

The topping process may be performed in a known manner, for example with a system with endless screws and a grooved cylinder to ensure a steady and homogeneous deposition. The change in product aspect is illustrated by FIG. 7. Dropping the topping pieces 47₁ between second stage 4 and third stage 5 on product 42 has several advantages. First, the drops either stick onto melted chocolate (product 42₁)—even on a surface inclined by 40°—or fall directly in-between biscuits and can be recycled with less than 1% pieces polluted by chocolate. Second, as the chocolate layer at that stage is still very thin—typically 0.2 to 0.3 mm—it is not distorted by the dropping of the pieces and remains smooth all around the impacts. Third, the pieces are covered afterwards by the second series of chocolate spraying, resulting in a very nice appearance: indeed the resulting chocolate cover is very thin—typically 0.2 to 0.3 mm—and lets the colour and surface profile of the topping pieces visible under a translucent layer 45 of chocolate which improves both appearance and taste, as each piece of topping is finely coated by chocolate. Furthermore, most of the topping pieces 42₂ (FIG. 7) are protected from air by this very thin layer of chocolate 45. Topping may be nuts, pralines, candied fruits etc. . . . .

The best results are obtained with a granularity of the topping pieces between 0.5 and 3 mm, preferably between 1 and 2 mm. With coarser granularity, the largest pieces are heavy and tend to slip down when they reach an inclined part of a curved biscuit. With finer granularity, a large ratio of biscuit surface is covered by very small particles, which deteriorates the appearance as chocolate looks no longer smooth. Depending on the desired appearance, taste and texture, the weight of pieces on one product is between 0.1 and 0.7 g, preferably between 0.2 and 0.5 g which means 5 to 13% of total product weight. Depending on the type of topping pieces, the number of pieces per product is between 20 and 100. The weight of pieces is easily set by the relative throughput of nut or fruit pieces and passage speed of biscuits underneath.

Figure 6:
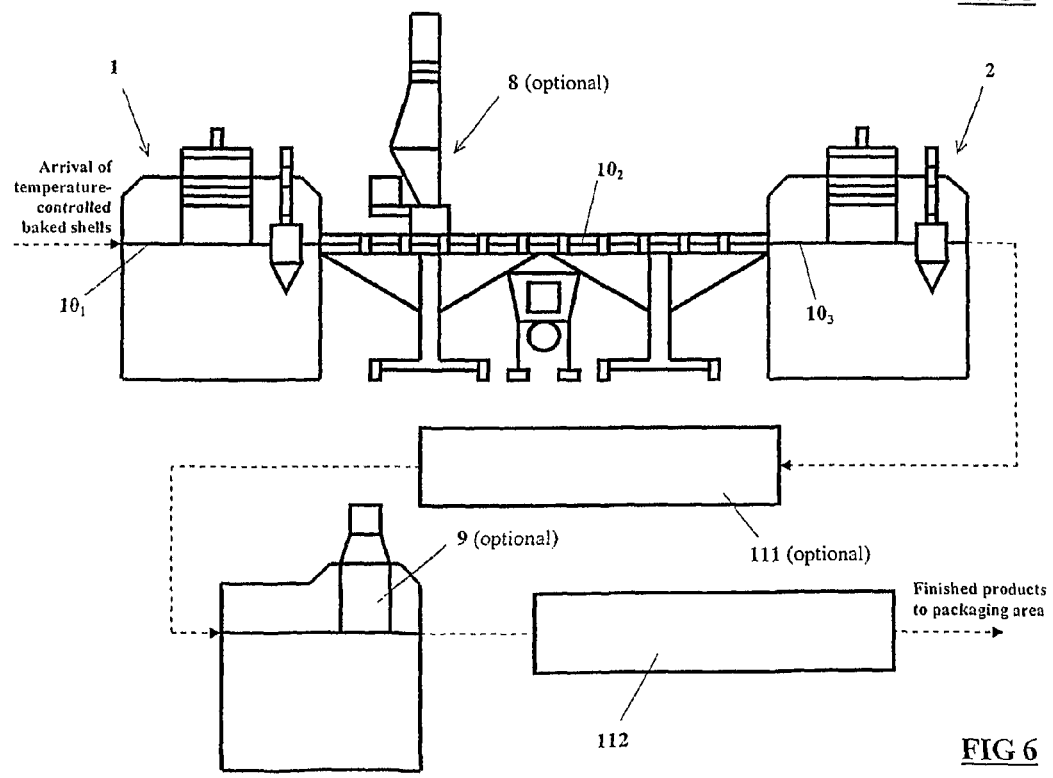
FIG. 6 is a production line scheme.

A complete apparatus to produce at industrial scale the biscuits as described above—typically N=16 lanes of biscuits moving at 10 m/min—is made of (FIG. 6):

1) an upstream flat conveyor fitted inside a radiant cooling tunnel (not shown), to transport the baked shells from their de-moulding device to the chocolate spraying station, while cooling them down to 27° C.;

2) a wire mesh conveyor $10_1$ fitted inside a first double jacketed frame and passing under the first series 1 of two rails of N+3=19 chocolate spraying nozzles constituting the first and second spraying stages;

3) a wire-mesh conveyor $10_2$ passing under a topping apparatus 8;

4) a wire-mesh conveyor $10_3$ fitted inside the second double-jacketed frame and passing under the second series 2 of two rails of 19 chocolate spraying nozzles constituting the third and fourth spraying stages;

5) the chocolate supply apparatus (FIG. 5), comprising main buffer tank 101, a tempering unit 102, a secondary buffer tank 103, 104 in which tempered chocolate stays less than 20 min, and the 4 above-mentioned rails of 19 nozzles each, supplied by a pressurised common rail system shown in FIG. 1a-1c;

6) a complete chocolate recycling apparatus, comprising an inferior tank receiving melted sprayed chocolate, a filter and a de-tempering unit 105 bringing back chocolate to the main buffer tank;

7) a flat conveyor moving the products at ambient temperature to start chocolate solidification before coating agent application with an optional cooling tunnel 111 during 2-3 min;

8) a coating agent spraying apparatus 9 comprising a rail of 19 spraying nozzles and a flat conveyor fitted inside;

9) a flat conveyor fitted inside a second cooling tunnel 112 (cooling during 6-7 min, or 8-10 min when cooling tunnel 111 and spraying apparatus 9 are not used) for chocolate crystallisation;

10) a downstream flat conveyor moving the products to packaging area.

The invention claimed is:

1. A process for applying a layer of a composition comprising at least fat and sugar on a surface of an edible product, wherein the method comprises submitting the product to at least two spraying stages, wherein at each stage a conical jet having an angle α between 12° and 25° and a vertical axis is generated by at least one nozzle, said nozzle being disposed above the product at a height H of between 200 mm and 800 mm such that, upon impinging on the product, the jet becomes a vertically oriented drizzle with a cylindrical cross-section.

2. A process as in claim 1, wherein the composition is chocolate or a chocolate substitute.

3. A process as in claim 1, wherein said drizzle has a diameter between 30 mm and 200 mm.

4. A process as in claim 1, wherein the process comprises two spraying stages, separated by a time interval between 1 to 5 seconds.

5. A process as in claim 1 wherein the process comprises two spraying stages, separated by a time interval between 4 to 40 seconds.

6. A process as in claim 1, wherein the process comprises three spraying stages.

7. A process as in claim 1, wherein the process comprises four spraying stages.

8. A process as in claim 6, wherein two stages which are successive and are separated by a time interval between 1 to 5 seconds.

9. A process as in claim 6, wherein the process comprises two successive spraying stages that are separated by a time interval between 4 to 40 seconds.

10. A process as in claim 7, wherein:
the first and second spraying stages are separated by a time interval between 1 to 5 seconds; the third and fourth spraying stages are separated by a time interval between 1 to 5 seconds; and
the second and third spraying stages are separated by a time interval between 4 to 40 seconds.

11. A process as in claim 1, wherein at least one nozzle is disposed between two lanes of moving products.

12. A process as in claim 1, wherein said conical jet is generated with an air pressure between 1.5 and 4 bar.

13. A process as in claim 12, wherein a throughput of the at least one nozzle is between 1.4 and 2.5 g/s.

14. A process as in claim 2, wherein the chocolate has a total fat content between 33% and 42%.

15. A process as in claim 14, wherein the viscosity of the chocolate, measured at 40° C., is between 700 mPa·s and 1300 mPa·s.

16. A process as in claim 1, wherein the edible product has a convex top surface having a radius of curvature between 25 mm and 32 mm, and a surface between 20 cm$^2$ and 30 cm$^2$.

17. A process as in claim 2, wherein the chocolate layer on the edible product has a thickness between 0.36 mm to 0.52 mm.

18. A process as in claim 1, wherein between two spraying stages, a topping step is performed.

19. A process as in claim 2, wherein after stages of chocolate spraying, and during a crystallisation of the chocolate layer, a final stage of spraying a coating product diluted in alcohol is performed.

20. A process as in claim 19, wherein the coating product is a mixture of purified shellac, vegetable oil and glycerine diluted at a level of less than 15% in ethanol.

21. A process as in claim 19, wherein the final stage is performed with at least one nozzle at a vertical distance H' between 90 mm and 120 mm above the surface of the products.

22. A process as in claim 19, wherein a final stage is performed with the chocolate layer being cooled between 24° C. and 26° C.

23. A process as in claim 19, wherein a final stage is performed between 2 and 3 minutes after the stages of chocolate spraying.

24. A process as in claim 19, wherein a final stage is performed with at least one nozzle at a pressure between 1.4 bar and 2 bar.

25. A process as in claim 1, wherein the edible product has an irregular or a curved surface.

26. A process as in claim 25, wherein the edible product is a curved shaped biscuit.

27. A process as in claim 1, wherein the height H is between 300 mm and 650 mm.

28. A process as in claim 4, wherein said drizzle has a diameter between 60 mm and 100 mm.

29. A process as in claim 1, wherein the composition comprises:
from 26 to 31% cocoa liquor;
from 31 to 37% sugar;
from 10 to 15% whole milk powder;
from 2 to 6% skimmed milk powder;
from 0 to 3% whey powder; and
from 14 to 20% cocoa butter.

* * * * *